(12) United States Patent
Clere

(10) Patent No.: US 7,189,774 B2
(45) Date of Patent: Mar. 13, 2007

(54) METHOD FOR MAKING HIGH THERMAL DIFFUSIVITY BORON NITRIDE POWDERS

(75) Inventor: Thomas M. Clere, Orchard Park, NY (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 375 days.

(21) Appl. No.: 10/843,140

(22) Filed: May 11, 2004

(65) Prior Publication Data

US 2004/0208812 A1 Oct. 21, 2004

Related U.S. Application Data

(62) Division of application No. 09/724,158, filed on Nov. 28, 2000, now Pat. No. 6,764,975.

(51) Int. Cl.
 *C08K 3/38* (2006.01)
 *C01B 21/064* (2006.01)
 *C04B 35/583* (2006.01)

(52) U.S. Cl. .................. 524/404; 501/96.4; 423/290

(58) Field of Classification Search ............. 524/404; 423/290; 501/96.4
 See application file for complete search history.

(56) References Cited

U.S. PATENT DOCUMENTS

| 2,991,508 A | 7/1961 | Reuben et al. |
| 3,125,547 A | 3/1964 | Blatz |
| 3,351,690 A | 11/1967 | Stover |
| 4,188,194 A | 2/1980 | Corrigan |
| 4,514,370 A | 4/1985 | Inoue et al. |
| 4,731,311 A | 3/1988 | Suzuki et al. |
| 4,801,445 A | 1/1989 | Fukui et al. |
| 4,863,881 A | 9/1989 | Ahrens et al. |
| 4,869,954 A | 9/1989 | Squitieri |
| 4,882,225 A | 11/1989 | Fukui et al. |

(Continued)

FOREIGN PATENT DOCUMENTS

DE 39 17 726 A1 7/1990

(Continued)

OTHER PUBLICATIONS

Hagio et al., "Sintering of the Mechanochemically Activated Powders of Hexagonal Boron Nitride," *J. Am. Ceram. Soc.*, 72(8):1482-84 (1989).

(Continued)

*Primary Examiner*—Vasu Jagannathan
*Assistant Examiner*—Sandra Poulos
(74) *Attorney, Agent, or Firm*—Nixon Peabody LLP

(57) ABSTRACT

The present invention relates to a method for making boron nitride powder having a thermal diffusivity of from about 0.14 cm$^2$/s to about 0.20 cm$^2$/s. This method involves pressing high purity, hexagonal boron nitride having an average platelet size of at least 2 microns into a compacted form, sintering the compacted form of boron nitride to form a sintered body, and crushing the sintered body under conditions effective to produce boron nitride powder having a thermal diffusivity of from about 0.14 cm$^2$/s to about 0.20 cm$^2$/s. Another aspect of the present invention relates to boron nitride powder having a thermal diffusivity of from about 0.14 cm$^2$/s to about 0.20 cm$^2$/s.

6 Claims, 1 Drawing Sheet

U.S. PATENT DOCUMENTS

| | | |
|---|---|---|
| 4,927,587 A | 5/1990 | Takahashi et al. |
| 5,011,870 A | 4/1991 | Peterson |
| 5,039,435 A | 8/1991 | Hanano |
| 5,116,589 A | 5/1992 | Hoenig |
| 5,194,480 A | 3/1993 | Block et al. |
| 5,213,868 A | 5/1993 | Liberty et al. |
| 5,234,712 A | 8/1993 | Howard |
| 5,283,542 A | 2/1994 | Ochiai et al. |
| 5,285,108 A | 2/1994 | Hastings et al. |
| 5,298,791 A | 3/1994 | Liberty et al. |
| 5,332,629 A | 7/1994 | Sumiya et al. |
| 5,374,036 A | 12/1994 | Rogers et al. |
| 5,508,110 A | 4/1996 | Howard |
| 5,510,174 A | 4/1996 | Litman |
| 5,528,462 A | 6/1996 | Pendse |
| 5,545,473 A | 8/1996 | Ameen et al. |
| 5,591,034 A | 1/1997 | Ameen et al. |
| 5,601,874 A | 2/1997 | Howard et al. |
| 5,610,203 A | 3/1997 | Buckmaster et al. |
| 5,614,319 A | 3/1997 | Wessels et al. |
| 5,660,917 A | 8/1997 | Fujimori et al. |
| 5,681,883 A | 10/1997 | Hill et al. |
| 5,688,449 A | 11/1997 | Fox |
| 5,688,457 A | 11/1997 | Buckmaster et al. |
| 5,726,502 A | 3/1998 | Beddingfield |
| 5,738,936 A | 4/1998 | Hanrahan |
| 5,770,819 A | 6/1998 | Mehan |
| 5,783,308 A | 7/1998 | Leendersen |
| 5,849,316 A | 12/1998 | Mellul et al. |
| 5,854,155 A | 12/1998 | Kawasaki et al. |
| 5,898,009 A | 4/1999 | Shaffer et al. |
| 5,898,217 A | 4/1999 | Johnston |
| 5,907,474 A | 5/1999 | Dolbear |
| 5,926,371 A | 7/1999 | Dolbear |
| 5,945,217 A | 8/1999 | Hanrahan |
| 5,945,478 A | 8/1999 | Buckmaster et al. |
| 5,950,066 A | 9/1999 | Hanson et al. |
| 5,962,122 A | 10/1999 | Walpita et al. |
| 5,981,641 A | 11/1999 | Takahashi et al. |
| 5,984,055 A | 11/1999 | Strasser et al. |
| 5,985,228 A | 11/1999 | Corrigan et al. |
| 6,048,511 A | 4/2000 | Shaffer et al. |
| 6,124,579 A | 9/2000 | Steinhauser et al. |
| 6,168,859 B1 | 1/2001 | Mills et al. |
| 6,251,513 B1 | 6/2001 | Rector et al. |
| 6,284,817 B1 | 9/2001 | Cross et al. |
| 6,300,607 B1 | 10/2001 | Steinhauser et al. |
| 6,541,111 B2 | 4/2003 | Fauzi et al. |
| 6,585,039 B2 | 7/2003 | Sagal et al. |
| 6,645,612 B2 | 11/2003 | Pujari et al. |
| 6,660,241 B2 | 12/2003 | Clere et al. |
| 6,713,088 B2 | 3/2004 | Lodyga et al. |
| 6,764,975 B1 | 7/2004 | Clere |
| 6,794,435 B2 | 9/2004 | Clere et al. |
| 6,867,445 B2 | 3/2005 | Jang |
| 2001/0048179 A1 | 12/2001 | Stewart et al. |
| 2002/0000651 A1 | 1/2002 | Takizawa et al. |
| 2002/0006373 A1 | 1/2002 | Clere |
| 2002/0006511 A1 | 1/2002 | Clere |

FOREIGN PATENT DOCUMENTS

| | | |
|---|---|---|
| EP | 0 279 769 A2 | 8/1988 |
| EP | 0 432 007 A1 | 6/1991 |
| EP | 0 479 387 B1 | 3/1995 |
| EP | 0 896 031 A2 | 2/1999 |
| EP | 0 939 066 A1 | 9/1999 |
| EP | 0 982 391 A1 | 3/2000 |
| JP | 61-268763 | 11/1986 |
| JP | 64-38424 | 2/1989 |
| JP | 11-26661 | 5/1989 |
| JP | 2-164433 | 6/1990 |
| JP | 04321506 A2 | 11/1992 |
| JP | 07157369 A2 | 6/1995 |
| JP | 09151324 A | 6/1997 |
| JP | 10204300 A | 8/1998 |
| JP | 11005907 A2 | 1/1999 |
| JP | 11-116213 | 4/1999 |
| JP | 11-209618 | 8/1999 |
| JP | 2000-508259 | 7/2000 |
| JP | 2003-518185 | 6/2003 |
| WO | WO 97/37828 | 10/1997 |
| WO | WO 01/46313 | 6/2001 |
| WO | WO 01/83371 | 11/2001 |
| WO | WO 01/83371 A2 | 11/2001 |

OTHER PUBLICATIONS

Carborundum Boron Nitride Data Sheet, "Cosmetic Grade Boron Nitride Powders" (Jun. 1998).

"Silicones & Silicon-Containing Polymers," *Petrarch Systems Silanes and Silicones: Silicon Compounds Register & Review* (1987).

Quotation (Jun. 5, 1998) and Request for Quotation Form (May 15, 1998).

Quotation (Dec. 2, 1999), Request for Quotation Form for Item 1, Item 2, and Item 3 (Nov. 30, 1999).

Phone Call Report (Oct. 20, 1998), Shipment Information for XP 1115 and Experimental Product Analysis (Oct. 23, 1998).

Quotation (May 19, 1999) and Experimental Product Analysis for XP 1104 (May 18, 1999).

Rudin et al., "Fluorocarbon Elastomer Aids Polyolefin Extrusion," *Plastics Engineering*, Society of Plastics Engineers, Inc. Greenwich, Conn. US, pp. 63-66 (1986).

Rosenbaum et al., "Boron Nitride as a Processing Aid for the Extrusion of Polyolefins and Fluoropolymers," *Polymer Engineering and Science* 40(1):179-190 (2000).

Jimènez et al., "Core-Level Photoabsorption Study of Defects and Metastable Bonding Configurations in Boron Nitride," *The American Physical Society* 55(18):12 025-12 037 (1997).

Trice et al., "Investigation of the Physical and Mechanical Properties of Hot-Pressed Boron Nitride/Oxide Ceramic Composites," *J. Am. Ceram. Soc.* 82(9):2563-2565 (1999).

Yip et al., "The Effect of the Boron Nitride on Melt Fracture in Blow Moulding Extrusion".

Yip et al., "The Effect of the Boron Nitride Type and Concentration on the Rheology and Processability of Molten Polymers," *Proc. ANTEC 1999*, Tech. Papers, 45:1223-1227 (1999).

Rosenbaum et al., "A New Processing Additive Eliminating Surface and Gross Melt Fracture in the Extrusion of Polyolefins and Fluoropolymers," *SPE/ANTEC 1998 Proceedings*, 952 (1998).

Seth et al., "The Effect of Surface Energy of Boron Nitride Powders on Gross Melt Fracture Elimination," *ANTEC 2001: Conference Proceedings*, 2634 (2001).

Dean & Pinter, "Novel Thermal Interface Material with Aligned Conductive Fibers," *Proceedings of the SPIE - The International Society for Optical Engineering Conference*, Johnson Matthey Electron., Spokane, WA, 3906:462-467 (1999).

us 7,189,774 B2

METHOD FOR MAKING HIGH THERMAL DIFFUSIVITY BORON NITRIDE POWDERS

The present application is a division of U.S. patent application Ser. No. 09/724,158, filed Nov. 28, 2000 now U.S. Pat. No. 6,764,975.

FIELD OF THE INVENTION

The present invention relates to a method for making high thermal diffusivity boron nitride powders and the resulting powders.

BACKGROUND OF THE INVENTION

Integrated circuit chips are steadily becoming smaller and more powerful. The current trend is to produce integrated chips which are steadily increasing in density and perform many more functions in a given period of time over predecessor chips. This results in an increase in the electrical current used by these integrated circuit chips. As a result, these integrated circuit chips generate more ohmic heat than the predecessor chips. Accordingly, heat management has become a primary concern in the development of electronic devices.

Typically, heat generating sources or devices, such as, integrated circuit chips, are mated with heat sinks to remove heat which is generated during their operation. However, thermal contact resistance between the source or device and the heat sink limits the effective heat removing capability of the heat sink. During assembly, it is common to apply a layer of thermally conductive grease, typically a silicone grease, or a layer of a thermally conductive organic wax to aid in creating a low thermal resistance path between the opposed mating surfaces of the heat source and the heat sink. Other thermally conductive materials are based upon the use of a binder, preferably a resin binder, such as, a silicone, a thermoplastic rubber, a urethane, an acrylic, or an epoxy, into which one or more thermally conductive fillers are distributed.

Typically, these fillers are one of two major types: thermally conductive, electrically insulative or thermally conductive, electrically conductive fillers. Aluminum oxide, magnesium oxide, zinc oxide, aluminum nitride, and boron nitride are the most often cited types of thermally conductive, electrically insulative fillers used in thermal products. Boron nitride is especially useful in that it has excellent heat transfer characteristics and is relatively inexpensive.

However, in order to achieve sufficient thermal conductivity with presently used fillers, such as boron nitride, it has been necessary to employ high loadings of filler in the binder (see, e.g., U.S. Pat. No. 5,898,009 to Shaffer et al. and U.S. Pat. No. 6,048,511 to Shaffer et al.). Thus, there is a need for thermally conductive filler materials which can be used at low loading levels to achieve sufficient thermal conductivity. The present invention is directed to overcoming this deficiency in the art.

SUMMARY OF THE INVENTION

The present invention relates to a method for making boron nitride powder having a thermal diffusivity of from about 0.14 $cm^2/s$ to about 0.20 $cm^2/s$. This method involves pressing high purity, hexagonal boron nitride having an average platelet size of at least 2 microns into a compacted form, sintering the compacted form of boron nitride to form a sintered body, and crushing the sintered body under conditions effective to produce boron nitride powder having a thermal diffusivity of from about 0.14 $cm^2/s$ to about 0.20 $cm^2/s$.

Another aspect of the present invention relates to boron nitride powder having a thermal diffusivity of from about 0.14 $cm^2/s$ to about 0.20 $cm^2/s$.

The method of the present invention produces high thermal diffusivity boron nitride powder which will exhibit high thermal conductivity when used as a filler for thermal management applications, e.g., in composites, polymers, and fluids. The resulting high thermal diffusivity boron nitride powder can also be used in composite polymers and metals for friction applications. Moreover, the resulting high thermal diffusivity boron nitride powder can be used as precursor feed stock material in the conversion of hexagonal boron nitride to cubic boron nitride.

DETAILED DESCRIPTION OF THE INVENTION

Figure 1:
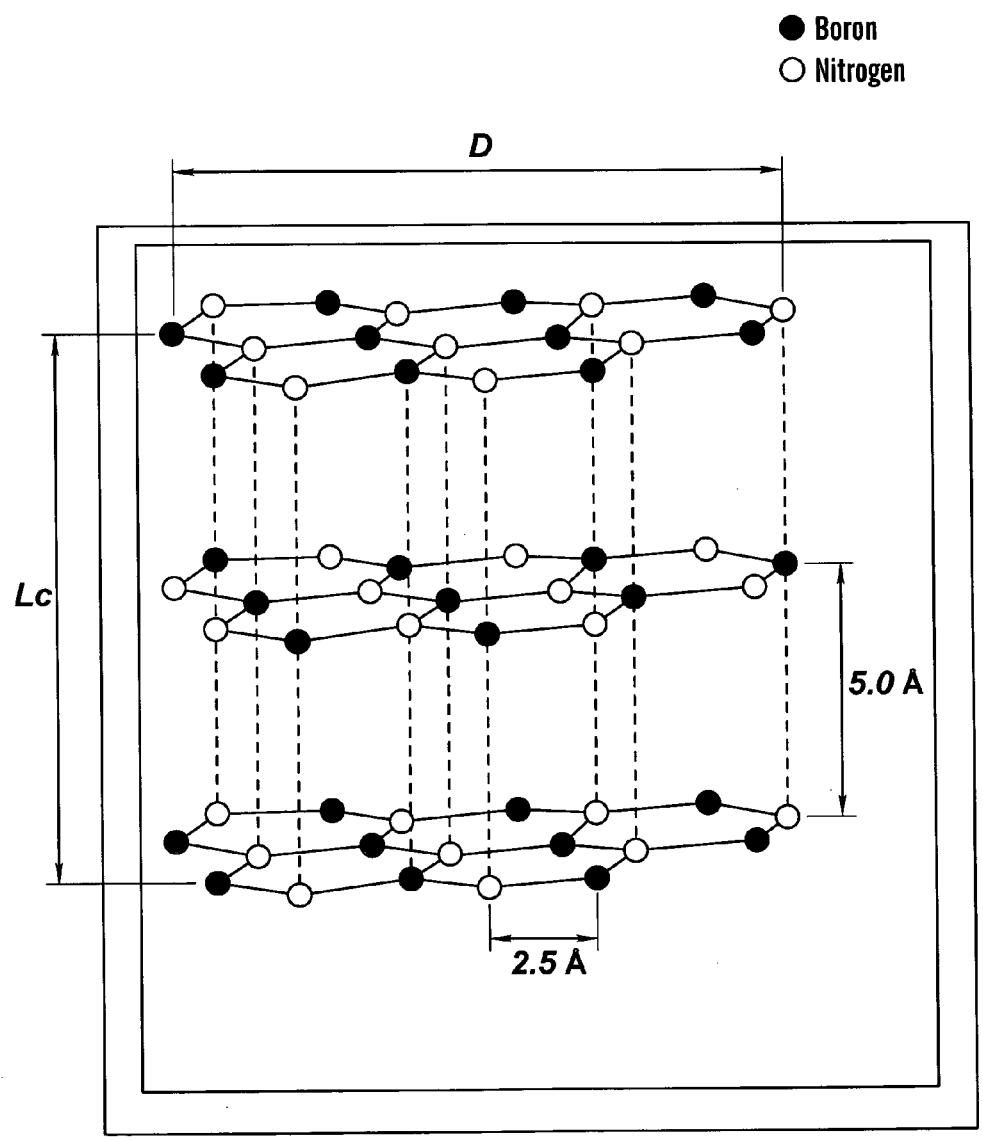
FIG. 1 is a graphic showing the structure of hexagonal boron nitride.

The present invention relates to a method for making boron nitride powder having a thermal diffusivity of from about 0.14 $cm^2/s$ to about 0.20 $cm^2/s$. This method involves pressing high purity, hexagonal boron nitride having an average platelet size of at least 2 microns into a compacted form, sintering the compacted form of boron nitride to form a sintered body, and crushing the sintered body under conditions effective to produce boron nitride powder having a thermal diffusivity of from about 0.14 $cm^2/s$ to about 0.20 $cm^2/s$.

Hexagonal boron nitride is an inert, lubricious ceramic material having a platey hexagonal crystalline structure (similar to that of graphite) ("h-BN"). The well-known anisotropic nature of h-BN can be easily explained by referring to FIG. 1, which shows hexagons of an h-BN particle. The diameter of the h-BN particle platelet is the dimension shown as D in FIG. 1, and is referred to as the a-direction. BN is covalently bonded in the plane of the a-direction. The particle thickness is the dimension shown as Lc, which is perpendicular to diameter and is referred to as the c-direction. Stacked BN hexagons (i.e., in the c-direction) are held together only by Van der Waals forces, which are relatively weak. When a shearing force greater than the weak Van der Waals force is imparted across of the planes of BN hexagons, the weak Van der Waals force is overcome and the planes slide relative to each other. The relative ease with which these planes of BN slide against each other may be one of the reasons for the high lubricity of h-BN.

Preferably, the h-BN is a powder having a highly ordered hexagonal structure. Such powders have a crystallization index (Hubacek, "Hypothetical Model of Turbostratic Layered Boron Nitride," *J. Cer. Soc. of Japan,* 104:695–98 (1996), which is hereby incorporated by reference) of at least 0.12 (quantification of highly hexagonal h-BN) and, preferably, greater than 0.15. Preferably, the h-BN powder has a crystallinity of about 0.20 to about 0.55, most preferably, from about 0.30 to about 0.55. Typically, this starting powder is produced by a "high fire" treatment of a raw, essentially turbostratic (amorphous) boron nitride powder (see Hagio et al., "Microstructural Development with Crystallization of Hexagonal Boron Nitride," *J. Mat. Sci. Lett.* 16:795–798 (1997), which is hereby incorporated by reference) to produce what is conventionally referred to as "high purity hexagonal boron nitride." In a preferred embodiment, a fine turbostratic BN powder having a crystallization index of less than 0.12 is heat treated in nitrogen at about 1400 to 2300° C. for about 0.5–12 hours. This heat treatment typically acts to produce a more coarse h-BN powder, as the fine, <1 μm crystallites, of turbostratic powder particles become more ordered (crystallized) and larger (>1 micron) during the heat treatment.

Preferably, the particles of the h-BN starting material have an average particle-platelet size of from about 2 μm to about 20 μm, more preferably between about 2 μm and 12 μm, and most preferably, between about 4 μm and about 12 μm. As used herein, "particle size" or "diameter" of the h-BN particle platelet is the dimension shown as D in FIG. 1. This is typically measured by scanning electron microscopy and laser scattering techniques using, e.g., a Leeds & Northrup Microtrac X100 (Clearwater, Fla.).

In another embodiment, the h-BN starting material has an oxygen content of from about 0 wt. % to about 1.0 wt. %, preferably, from about 0 wt. % to about 0.5 wt. %. The use of h-BN starting material with a low oxygen content produces boron nitride powders with a higher tap density. Higher tap density powders have many advantages as fillers in thermal management applications including: higher thermal conductivity, higher powder loading in a matrix; stronger agglomerates of h-BN particles (leading to improved metal adhesion in polymer BN composites); and lower porosity within the agglomerates (which results in less infiltration of polymer resin or liquid into the agglomerate).

In a preferred embodiment, the boron nitride powder having a thermal diffusivity of from about 0.14 $cm^2/s$ to about 0.20 $cm^2/s$ (i.e., high thermal diffusivity boron nitride powder) has a tap density of from about 0.7 g/cc to about 0.9 g/cc.

In yet another embodiment, the h-BN starting material has a surface area of from about 1 $m^2/g$ to about 10 $m^2/g$, and more preferably, about 2 $m^2/g$ to about 4 $m^2/g$.

The high purity, hexagonal boron nitride starting material may be, but is not limited to, boron nitride powder, boron nitride briquettes, crushed boron nitride briquettes, granulated boron nitride, spray dried boron nitride, or combinations thereof.

In accordance with the present invention, the high purity, hexagonal boron nitride is pressed into a compacted form. Suitable methods for pressing the hexagonal boron nitride include hot uniaxial pressing, cold uniaxial pressing, hot isopressing, and cold isopressing. Pressing is preferably carried out at a pressure of about 1 ksi to about 60 ksi. Most preferably, the high purity, hexagonal boron nitride is cold isopressed into a compacted form at from about 5 ksi to about 60 ksi.

In a preferred embodiment, the compacted form of boron nitride has a thermal diffusivity of from about 0.08 $cm^2/s$ to about 0.14 $cm^2/s$.

In another preferred embodiment, the compacted form of boron nitride has a density of between 1.60 g/cc and 1.86 g/cc.

Preferably, the sintering is carried out at a temperature of at least about 1400° C. for about 0.5 to about 12 hours, more preferably, for about 1 to about 8 hours. Further, the sintering is preferably carried out at from about 1400° C. to about 2300° C., more preferably, from about 1700° C. to about 2300° C., most preferably, from about 1950° C. to about 2100° C. Suitable atmospheres for sintering include inert gas, nitrogen, and argon. In one embodiment, the sintering is carried out in a vacuum. In an another embodiment, the sintering is carried out under conditions of at least 1 atmosphere of pressure.

In one embodiment, the sintered body has a density of about 1.4 g/cc to about 1.7 g/cc. The resulting powder tap density preferably ranges from 0.7 g/cc to 0.9 g/cc.

In accordance with the present invention, the sintering step improves the thermal diffusivity and, thus, thermal conductivity of the resulting boron nitride powder. Although not wishing to be bound by theory, it is believed that during sintering, individual grains of boron nitride grow into each other to form an interconnected network. The interconnectivity of the resulting sintered body results in increased thermal diffusivity and increased thermal conductivity. Preferably, after sintering the thermal diffusivity increases above the compacted green body to about 0.18 $cm^2/sec$.

Suitable methods for crushing the sintered body include jaw crushing and roll crushing. The sintered body is crushed into agglomerates of high thermal diffusivity boron nitride having a desired agglomerate size. As used herein, an agglomerate means a collection of boron nitride particles bonded together. Preferably, the sintered body is crushed into agglomerates of high thermal diffusivity boron nitride of from about 20 microns to about 500 microns. Most preferably, the majority of boron nitride agglomerates have an average agglomerate size at least 30 to 105 microns.

In another embodiment, the high thermal diffusivity boron nitride powder is classified under conditions effective to obtain a desired agglomerate size distribution. Suitable methods for classification include screening, air classifying, and elutriation, (see Chem. Eng. Handbook, Perry & Chilton, $5^{th}$ Ed., McGraw-Hill (1973), which is hereby incorporated by reference). As such classification methods are well known in the art, they will only be discussed briefly herein.

Screening is the separation of a mixture of various sized solid particles/agglomerates into two or more portions by means of a screening surface. The screening surface has openings through which the smaller particles/agglomerates will flow, while the larger particles/agglomerates remain on top. This process can be repeated for both the coarse and small particle/agglomerate size streams, as many times as necessary, through varying screen openings to obtain a classification of particles/agglomerates into a desired particle/agglomerate size range.

Air classifiers rely upon air drag and particle inertia, which depends upon particle/agglomerate size, to facilitate the separation of fine particles/agglomerates from coarse particles/agglomerates.

One design for elutriation is a vertical gravity type elutriator, where fluid flowing up through a column carries fine particles/agglomerates smaller than a critical size. The critical size is determined by the settling velocity of the particle/agglomerate in the fluid.

A desired agglomerate range or agglomerate size distribution (ASD) is determined by the intended use Of the high thermal diffusivity boron nitride powder. For example, for compliant interface pads, where the polymer is a low durometer silicone rubber, the desired ASD is such that the coarsest agglomerate diameter is smaller than the thickness of the interface pad. For situations in which viscosity control is important in either processing or in the application of a fluid product that is thixotropic, fine particles, e.g., up to 38 microns, are reduced in concentration or removed entirely, which leads to improved processing and wetting of the boron nitride by a polymer and provides a mixture that flows more freely.

Preferably, the ASD is 30 to 125 microns (more preferably 74 to 125 microns, most preferably 74 to 105 microns), or 20 to 74 microns (more preferably 38 to 74 microns, most preferably 38 to 53 microns), or 10 to 38 microns (more preferably 20 to 38 microns).

The above-described method of the present invention provides an efficient technique for preparing high thermal diffusivity boron nitride powder as it requires only a single crushing step, a single sintering step, and a single pressing step. This is in contrast to prior art methods (see, e.g., U.S. Pat. No. 5,898,009 to Shaffer et al. and U.S. Pat. No. 6,048,511 to Shaffer et al., which are hereby incorporated by reference) which require numerous crushing and pressing steps, but no sintering steps.

The method of the present invention produces high thermal diffusivity boron nitride powder which can be used as a filler for thermal management applications, e.g., in composites, polymers, and fluids. Polymer systems may include melt-processable polymers, polyesters, phenolics, silicone polymers (e.g., silicone rubbers), acrylics, waxes, thermoplastic polymers, low molecular weight fluids, and epoxy molding compounds. The thermal conductivity of the resulting polymer-boron nitride composite or fluid is determined by loading, dispersion, and other factors. The resulting high thermal diffusivity boron nitride powder can also be used in composite polymers and metals for friction applications. Moreover, the resulting high thermal diffusivity boron nitride powder having a tap density of from about 0.7 g/cc to about 0.9 g/cc can be used as precursor feed stock material in the conversion of hexagonal boron nitride to cubic boron nitride. In the conversion of high purity hexagonal boron nitride to cubic boron nitride, the compacted form of boron nitride is subjected to extremely high pressures and temperatures within the stable region of the cubic boron nitride phase diagram. The density of the boron nitride pellets is significant to the economics of the cubic boron nitride conversion process.

Another aspect of the present invention relates to a boron nitride powder having a thermal diffusivity of from about 0.14 $cm^2/s$ to about 0.20 $cm^2/s$.

Preferably, the boron nitride powder has a tap density of from about 0.7 g/cc to about 0.9 g/cc.

EXAMPLES

Example 1

Preparation of Boron Nitride (BN) Powder Using Low Surface Area BN Starting Material Boron nitride having a surface area of 2 to 4 $m^2/g$, an average agglomerate size less than 210 microns, a primary platelet size of 6 to 12 microns, an oxygen content of less than 1%, and a $B_2O_3$ content of less than 0.1%, was isopressed at 20 ksi into a compacted form (all experiments described herein were repeated twice). The compacted form of boron nitride had a green density of between 1.66 and 1.70 g/cc. The thermal diffusivity was measured by laser flash technique (using an Appollo Laser, Model M22) and was found to be between 0.085 and 0.14 $cm^2/sec$. The compacted green bodies were then sintered at 2000° C. for 0.5 to 2 hours. The density of the sintered body was found to have decreased to 1.42 to 1.55 g/cc. The thermal diffusivity was measured again by the same technique and found to have increased to 0.182 $cm^2/sec$. The sintered body was then crushed in a roll mill (Model 666 "F" Gran-U-Lizer, Modern Process Equipment, Chicago, Ill.). The tap densities of powders after sintering were in the range of 0.74 to 0.81 g/cc.

Example 2

Preparation of Starting BN Powder

A submicron, dried, filter cake made up of boron nitride powder synthesized at temperatures below 1400° C. (see, e.g., Paine et al., "Synthetic Routes to Boron Nitride," Chem. Rev., 90:73–91 (1990), which is hereby incorporated by reference) was heat-treated at approximately 2000° C. for about 12 hours. The resulting sintered born nitride powder cake had a bulk density of about 0.85 g/cc, a surface area of between 2 and 4 $m^2/g$, and an oxygen content of less than 0.5 wt. %. The cake was subsequently roll crushed to two types of powder: agglomerates ranging from 30 to 700 microns and fines less than 30 microns. These powders served as BN starting material for sintering.

Example 3

Preparation of BN Powder Using Fines Starting Material

The fines of Example 2 were isopressed at 20 ksi resulting in a compacted form having a green density of 1.74 g/cc. This green compacted form was then sintered at about 2050° C. for about 2 hours, after which the sintered density was measured to be 1.60 g/cc. The tap density of the powder prepared by roll crushing and classifying to an agglomerate size distribution between 30 and 105 microns was found to be approximately 0.83 g/cc.

Example 4

Preparation of BN Powder Using Agglomerate Starting Material

Agglomerated starting BN powder having agglomerates of BN particles having an average agglomerate size of about 400 to 700 microns, as described in Example 2, was isopressed and sintered as described in Example 3. The resulting compact green density was measured to be 1.66 g/cc. The sintered compact density was measured to be 1.56 g/cc. The tap density of powder from this sintered agglomerate was 0.81, g/cc.

Example 5

Preparation of BN Powder Using a Blend Starting Material

A roll-crushed blend of agglomerates and fines were used as a starting material. The resulting green density of the compacted form after isopressing at 20 ksi was 1.66 g/cc. After sintering at about 2050° C. for 2 hours the sintered density was measured to be 1.52 g/cc. The tap density of 30 to 105 micron agglomerates was found to be about 0.79 g/cc.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the claims which follow.

The invention claimed is:

1. A polymer blend comprising:
   a polymer, and
   a powder phase comprising a boron nitride powder having a thermal diffusivity of from about 0.15 cm$^2$/s to about 0.20 cm$^2$/s and an average particle size of from about 2 μm to about 20 μm, wherein the powder phase is distributed homogeneously within the polymer.

2. The polymer blend according to claim 1, wherein the polymer is a melt-processable polymer.

3. The polymer blend according to claim 1, wherein the polymer is selected from the group consisting of polyesters, phenolics, silicone polymers, acrylics, waxes, thermoplastic polymers, low molecular weight fluids, and epoxy molding compounds.

4. The polymer blend according to claim 1, wherein the boron nitride powder comprises agglomerates of boron nitride particles having an average agglomerate size of from about 20 microns to about 500 microns.

5. The polymer blend according to claim 4, wherein the majority of boron nitride agglomerates have an average agglomerate size of from about 30 microns to about 105 microns.

6. The polymer blend according to claim 1, wherein the boron nitride powder has a tap density of about 0.7 g/cc to about 0.9 g/cc.

* * * * *